United States Patent
Barlev et al.

(10) Patent No.: US 9,313,701 B2
(45) Date of Patent: Apr. 12, 2016

(54) SEAMLESS HANDOFF AND CALL BINDING

(71) Applicant: U-TX Ltd, Limassol (CY)

(72) Inventors: Yisay Barlev, Limassol (CY); Slawomir Armista, Limassol (CY); Roy Glasberg, Nicosia (CY)

(73) Assignee: UTX TECHNOLOGIES LIMITED, Limassol (CY)

(*) Notice: Subject to any disclaimer, the term of this patent is extended or adjusted under 35 U.S.C. 154(b) by 0 days.

(21) Appl. No.: 14/292,913

(22) Filed: Jun. 1, 2014

(65) Prior Publication Data

US 2014/0357278 A1    Dec. 4, 2014

Related U.S. Application Data

(60) Provisional application No. 61/830,661, filed on Jun. 4, 2013.

(51) Int. Cl.
*H04W 36/00* (2009.01)

(52) U.S. Cl.
CPC ............. *H04W 36/0083* (2013.01)

(58) Field of Classification Search
CPC ............. H04W 36/00; H04W 36/0083
USPC .................. 455/436–443; 370/331
See application file for complete search history.

(56) References Cited

U.S. PATENT DOCUMENTS

| | | | | |
|---|---|---|---|---|
| 5,428,667 | A * | 6/1995 | Easterling et al. | 455/410 |
| 2011/0306346 | A1 * | 12/2011 | Yoon et al. | 455/437 |
| 2013/0279474 | A1 * | 10/2013 | Dimou et al. | 370/331 |

* cited by examiner

*Primary Examiner* — Wayne Cai
(74) *Attorney, Agent, or Firm* — Meunier Carlin & Curfman

(57) ABSTRACT

The invention provides a method and system for third party eavesdropping to communications of a target wireless electronic device. The method comprises: providing a private network system adapted to intercept communications of a target wireless device; obtaining communication characteristics of a target wireless electronic device; instructing the target wireless device to obtain measurements of public network cells in the vicinity of the target device; instructing the target device to report the measurements to the private network system; and activating the private network to eavesdrop on communications occurring on the target wireless electronic device by impersonating the target wireless device. While communication occurs on the target device, a handover is induced to a public network cell, and the handover is followed to continue eavesdropping on the communication.

6 Claims, 3 Drawing Sheets

SEAMLESS HANDOFF AND CALL BINDING

FIELD OF THE INVENTION

The present invention generally relates to mobile telephone technology, and more particularly to a system and method for eavesdropping on a communication, voice or otherwise, of an electronic device capable of communicating with a radio network. Non-limiting examples of electronic devices for use with the invention include: mobile phones, smart phones, mobile subscribers, palmtop, notepads and laptops.

BACKGROUND OF THE INVENTIONS

It is known in the art to eavesdrop on communications (such as voice calls) performed by a wireless device connected to a private network to a recipient on a public network. This involves allowing, on one hand, the wireless device to actively connect and communicate (e.g. call, incoming or outgoing) via a private network, and on the other hand, using a modem to impersonate the identity of the wireless device and place a call on its' behalf on the public network, to a recipient. By controlling both sides of such a setup, one can eavesdrop on the communication occurring between the wireless device and its recipient.

It is known in the art for a non-authorized third party such as an eavesdropper, to move an idle wireless device to a public network operator (handoff).

However, it is non-trivial and not obvious for a non-authorized third party to be able to perform a seamless-handoff—to handoff a device while that device is engaged in communication (e.g. phone call), i.e. when the device is non-idle. While there are published methods for non-idle handoff, they all result in severing the communication of the wireless device, which is deleterious as this may alert the user to the presence of eavesdropping.

Moreover, even when the above is achieved, any eavesdropping capability is lost in prior art once the wireless device stops communicating with the private network and moves to the public network. Being able to accomplish seamless handoff to a public network while maintaining communication and eavesdropping capabilities at the same time is non-trivial and not obvious to accomplish.

Thus, it would be advantageous to enable continuous, uninterrupted communication, including but not limited to, voice call and handoff of a wireless device (e.g., a mobile phone) to a public network, while eavesdropping to communications throughout the entire process, until such communications stop.

SUMMARY OF THE INVENTIONS

Accordingly, it is a principal object of the present inventions to provide a method and system for continuous, uninterrupted communication and handoff of a wireless device (e.g., a mobile phone) from a private network to a public network. Non-limiting examples of communication allowed are: voice calls, text messages and multimedia messages.

It is another principal object of the present inventions to covertly eavesdrop on the communication throughout the handoff process—on the private network, during the handoff procedure and on the public network after the handoff is completed.

The term "private network" as used in the present invention refers to a third party system capable of intercepting communications from a target wireless device, without knowledge of the user of said target device. The third party system provides the target device with wireless communication service, while eavesdropping to communications occurring on the wireless device.

The term "public network" as used in the present invention refers to a radio network (such as, but not limited to, cellular network) capable of communicating with multiple wireless devices and providing them with service, such as phone calls, SMS, packet data communication etc. One example of a public network would be the PSTN.

The term "handoff" as used in the present invention refers to moving a wireless device from a private network system to a public network operator. The term "handover" as used in the present invention refers to passing handling of communication occurring from a wireless phone, from one cell tower to another while a phone call is in progress.

The term "modem" or "second device" or "intercepting device" are used interchangeably in the present invention to refer to a wireless communication device having a programmed interface, giving control to a program which runs on a computer and allowing it to perform any operation which a hand-held wireless device can perform.

The term "wireless device" refers to an electronic device capable of communicating with a radio network. Non-limiting examples of electronic devices for use with the invention include: mobile phones, smart phones, mobile subscribers, palmtop, personal digital assistants (PDA), notepads and laptops.

One embodiment of the present invention relates to handing a wireless device, e.g., a mobile phone, which is making a voice call with a cell of a private network A, off to another network B, called 'the public network', while networks A and B are not connected and have no other inter-communication. This handoff is performed without the voice call dropping or being interrupted in any way. This will release resources in network A and transfer the effort to network B.

Another embodiment in the invention relates to the continuous eavesdropping to the communication of the wireless device (e.g., a mobile phone) and the radio network, throughout the process, i.e. starting with when the device is communicating with private network A and ending with when the device is communicating with public network B. The stream of data produced by this eavesdropping is continuous and uninterrupted for as long as the wireless device is communicating with its respective network.

Continuous eavesdropping to the communication of the wireless device (e.g., a mobile phone) can be achieved with the various embodiments of the methods of the invention as presented herewith.

BRIEF DESCRIPTION OF THE DRAWINGS

In order to understand the invention a preferred embodiment will now be described, by way of a non-limiting example only, with reference to the accompanying drawings, in which.

All the above and other characteristics and advantages of the inventions will be further understood through the following illustrative and non-limitative description of preferred embodiments thereof.

DETAILED DESCRIPTION OF PREFERRED EMBODIMENTS

The principles and operation of the present inventions may be better understood with reference to the drawings and the accompanying description. These are given for illustrative purposes only and are not meant to be limiting.

The present invention provides a system and method for enabling continuous, uninterrupted communication, such as voice call and handoff of a wireless device to a public network, while allowing third-party eavesdropping to the communication throughout the whole process until such communication stops.

In general, a private network is activated, for intercepting and eavesdropping on phone communications of target wireless phones. The private network comprises appropriate hardware running the software of the invention. Once a communication of a target phone is intercepted, the private network induces a handover by sending the cell provider in the public network, a false report of poor reception for the serving cell. This results in a monitored seamless handoff, allowing continued communication which can be eavesdropped upon. Such a third party induced handover was not previously known in the art, and it was not known how to continue to eavesdrop to communications once external handoffs to public networks occurred. The induced handover allows the public network to provide the majority of resources for communication, and frees up the private network to eavesdrop to additional target wireless phones.

Typically, the process of the invention is automated and does not require human intervention. In the following description, voice communication is used as a typical example however any type of communication may be monitored using the invention.

Figure 1:
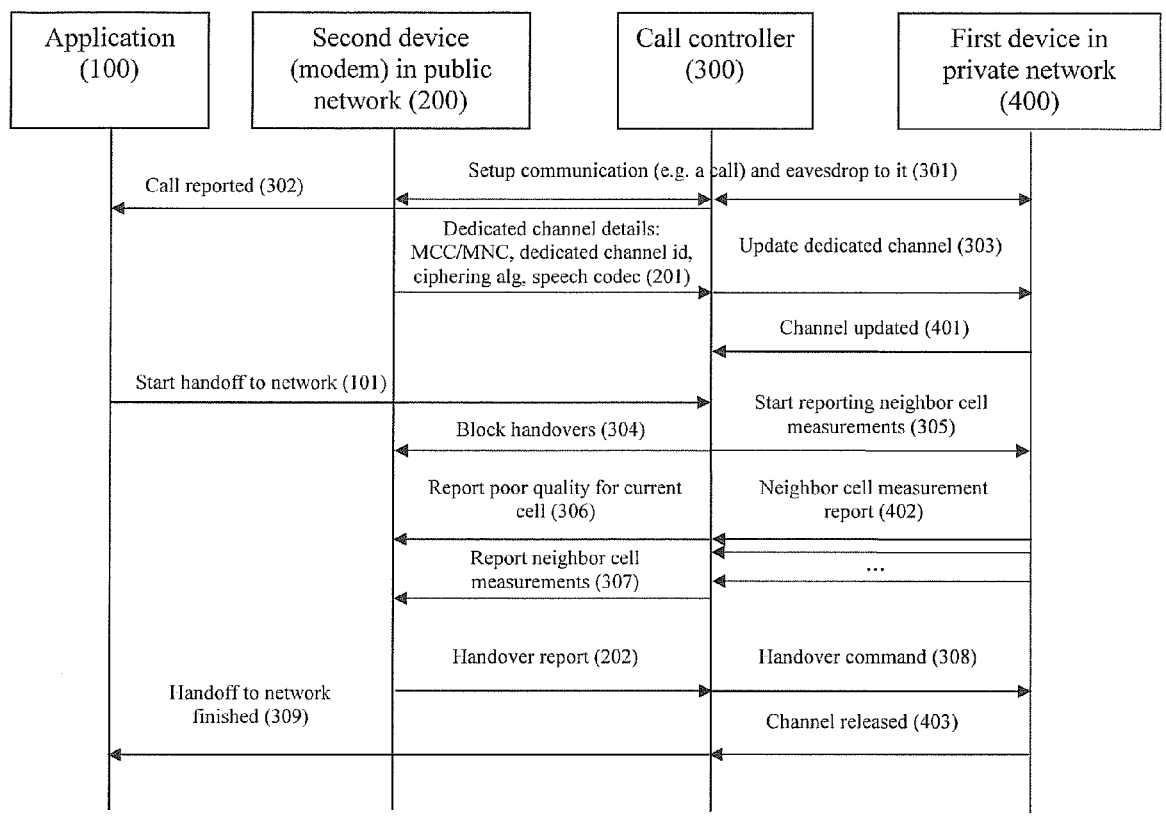
FIG. 1 is a timeline diagram for achieving handoff to the public network, showing the flow between various hardware and software components of the inventions.

FIG. 1 shows a flow of information during the handoff of the wireless device from the private network ran by the eavesdropping party, to the public network. This type of handoff will result in eavesdropping to the wireless device's communication, while keeping the communication uninterrupted.

The following process described in relation to FIG. 1, occurs after a wireless device has synchronized its RF radio with a private network (400) and has registered to that private network. The wireless device is idle and camps on the private network cell.

It's also assumed that the wireless device has already established communication (301), such as a phone call, with the private network and that the communication was successfully forwarded to the public network using an intercepting device (e.g. a modem, such as a Samsung MC35 Modem) controlled (300) by the private network, which impersonates the first device. This intercepting device allows continuous eavesdropping to the first device's communication as long as it is in communication with the private network.

The software application controlling the invention (100) receives a report (302) of calls being performed, as does the call controller module. The call controller module receives (201) all the characteristics of the dedicated channel between the intercepting device and the public network: public network ID (MCC/MNC), dedicated channel identification, which ciphering algorithm is used, speech codec, etc. The call controller then updates (303, 401) the private network so those characteristics of the communication channel between the first device and the private network will be identical to those of the channel between the second (intercepting) device and the public network.

While the communication is still active, an event is sent from the software of the invention instructing to perform an induced seamless handoff (101), as follows:

The wireless device is instructed (305) to report measurement of the public network cells in the area, to select the best cell to handover the device to, usually the one with the strongest signal. At the same time (304), the second device is instructed not to perform the handover request sent to it by the public network, and to report such requests back to the controller.

When neighbor cell measurements start coming from the first device (402), they're forwarded (307) to the intercepting device, and a false report is sent to the public network (306) that the current serving cell of the second device has poor signal quality.

This, in turn, causes the public network to send a handover command to the second device. This command is reported (202) to the controller, which forwards it (308) to the first device through the private network. The first device follows the handover command to the dedicate channel on the public network.

When the private network detects no power and no messages coming on its channel with the first device, a channel release procedure (403) is initiated. At that time the call controller reports back (309) that the handoff was successfully finished.

Some advantages of the invention are: The induced handoff frees resources, as for each eavesdropped call there is an occupied intercepting modem+resources from the private network. Thus, the invention allows a system with limited resources (such as the number of modems, and the size of the private network) to be used to eavesdrop on practically a limitless number of calls. This is the first time one can eavesdrop to a conversation after it is handed off to the public network, without interrupting communication.

Figure 2:
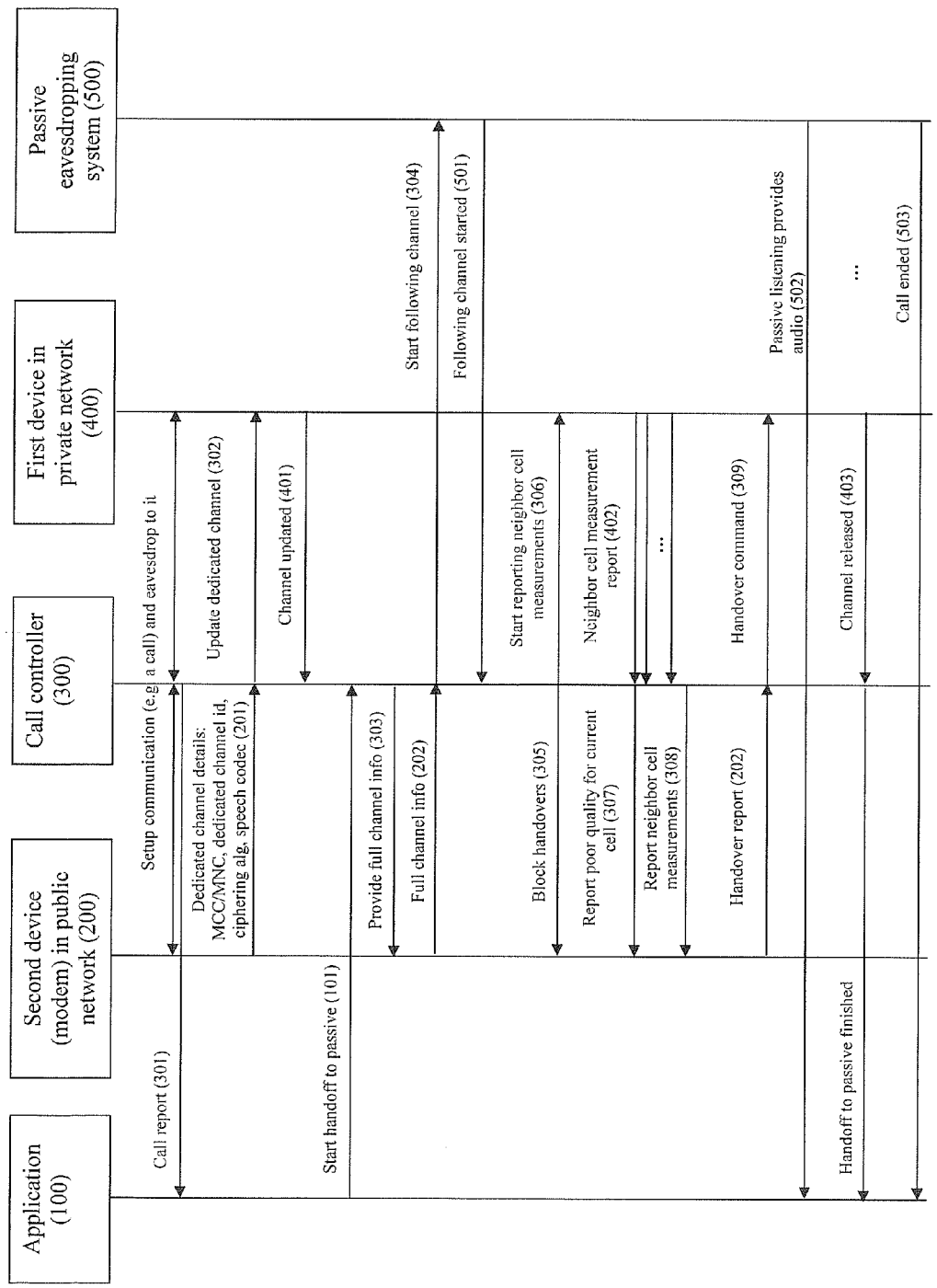
FIG. 2 is a timeline diagram for achieving handoff to the public network along continued eavesdropping by a passive listening system.

FIG. 2 shows a flow of information during the handoff of the wireless device to the public network while a passive eavesdropping system (500) is included in the process so that eavesdropping to the device's communication will continue, while keeping that communication uninterrupted. This flow is similar to the one described in FIG. 1, with the following additions which ensure that eavesdropping will continue even after the handoff is made to the public network:

After the process was initiated (101) and the channel setup, the call controller requests (303) and receives (202) the characteristics of the dedicated channel of the second device on the public network. These characteristics are required by the passive listening elements in order to eavesdrop on the public network channel (304).

Once the passive listener confirms (501) that eavesdropping to the public network was achieved, the controller continues to perform the handoff (305 till 309). Eavesdropped communication is provided to the Application (100) by the controller (300) until and during the handoff procedure. Further eavesdropped communication is then provided by the passive listener (502), until such communication is ended by the monitored device (503).

Figure 3:
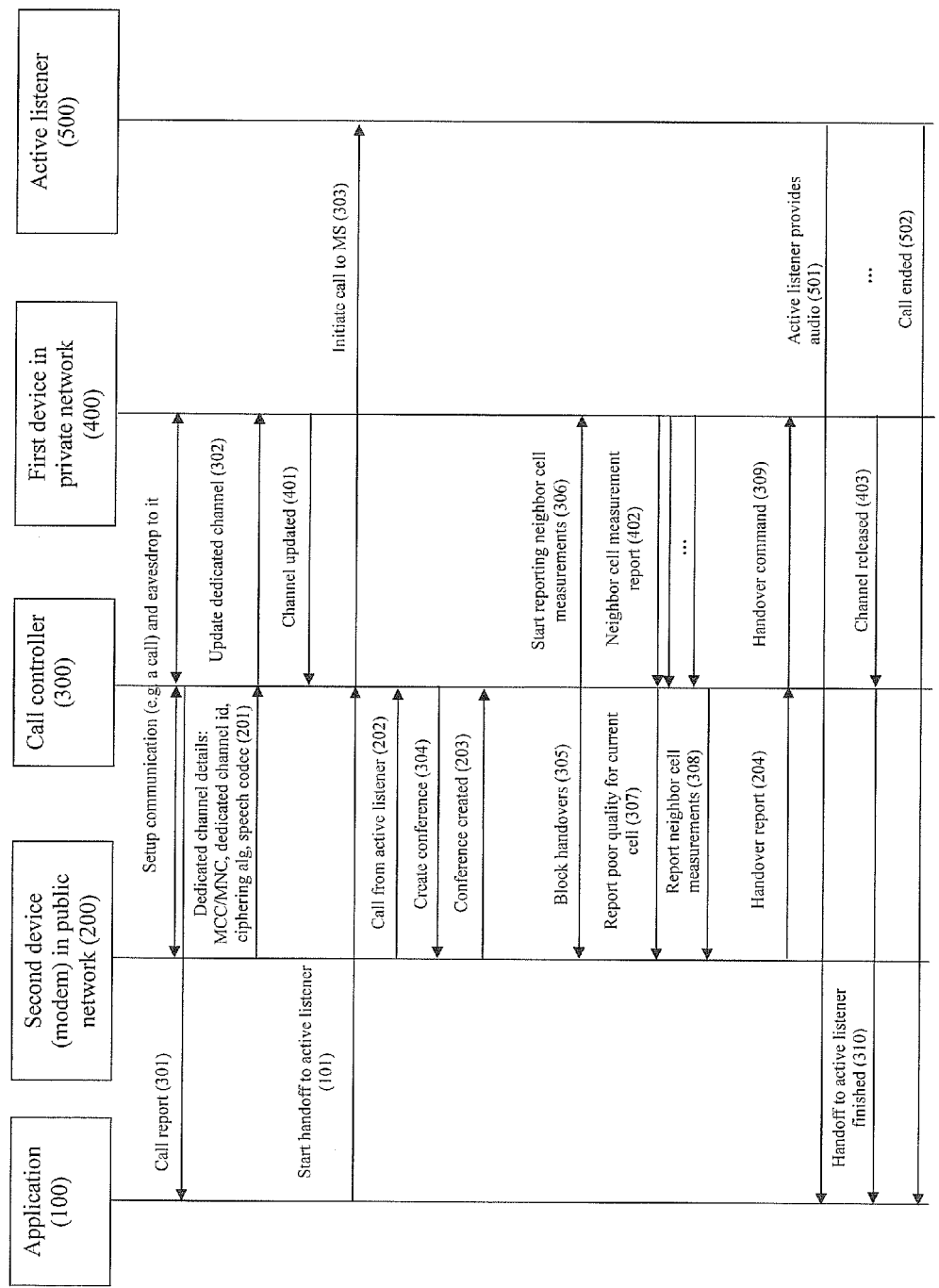
FIG. 3 is a timeline diagram for achieving handoff to the public network along continued eavesdropping by an active listening system.

FIG. 3 shows a flow of information during the handoff of the wireless device to the public network while an automated active listener (500) is attached to the process so that eavesdropping to the device's communication will continue, while keeping that communication uninterrupted. This flow is similar to the one described in FIG. 2, while including the following:

After the process was initiated (101) and the channel setup, the call controller requests the Automated Active Listener (500) to initiate a call towards the first device on the public network (303). This call is being received (202) by the second (intercepting) device, which is on the public network impersonating the first device. The call controller than requests to connect both calls in a conference (304), resulting in the active listener having access to the voice transferred on the public network.

In a presently preferred embodiment, the conference call is performed using additional hardware capable of placing phone calls, and not by the intercepting device. As the conference call is connected on the public network, it remains undetectable by the user of the targeted wireless phone.

Once the conference is established (203), the controller continues to perform the handoff (305 till 309). Eavesdropped communication is provided to the Application (100) by the controller (300) until and during the handoff procedure. Further eavesdropped communication is then provided by the active listener (501), until such communication is ended by the monitored device (502).

The invention thus provides eavesdropping on wireless communications after a wireless device has been transferred to a public network, which was previously unknown without interrupting communication of the target device. The induced seamless handoff described in the invention frees up the communication resources of the private intercepting network, thus allowing eavesdropping to an unlimited number of target wireless devices.

The invention claimed is:

1. A method for third party eavesdropping to communications of a target wireless electronic device and for handoff of the target wireless electronic device from a private network system to a public network while consciously eavesdropping to said communications without interrupting said communications during said handoff, the method comprising:
providing a private network system adapted to intercept communications of a target wireless device and to forward the intercepted communications to a public network;
activating said private network system to eavesdrop on communications occurring on said target wireless electronic device by impersonating said target wireless electronic device; and
while communication occurs on said target wireless electronic device and while eavesdropping said communication, inducing a handover of said target wireless electronic device from said private network system to a public network cell of said public network, and following said handover to continue eavesdropping on said communication by said private network system;
wherein said step of inducing the handover comprises:
instructing said target wireless electronic device, by the private network system, to obtain measurements of public network cells present in the vicinity of said target wireless electronic device;
instructing said target wireless electronic device, by the private network system, to report said measurements back to said private network system; and
falsely reporting, by the private network system to said public network, that an initial network cell serving said target wireless electronic device has a poor signal quality, wherein said false report causes the public network to send a handover command to the private network system.

2. The method of claim 1, wherein said step of following said handover comprises setting said private network to adjust one or more of the following characteristics of a channel between said private network and said public network, wherein the characteristics include: a displayed public network ID (MCC/MNC), a dedicated channel identification, a selected ciphering algorithm, and a selected speech codec.

3. The method of claim 1, wherein said target electronic wireless device is selected from: a cellular phone, a smart phone, a mobile subscriber, a palmtop, a personal digital assistant (PDA), a notepad and a laptop computer.

4. The method of claim 1, wherein said private network system adapted to intercept communications of a target wireless device comprises a modem.

5. The method of claim 1, wherein said step of following said handover comprises performing a conference call with said target electronic wireless device upon said public network; said conference call being non-detectable to a target user.

6. A system for third party eavesdropping to voice communications of a target wireless electronic device and for handoff of the target wireless electronic device from a private network system to a public network while consciously eavesdropping to said communications without interrupting said communications during said handoff, the system comprising:
a private network system adapted to intercept communications of a target wireless device and to forward the intercepted communications to a public network;
a processor;
a memory holding instructions that, when executed by the processor, cause the processor to:
activate said private network system to eavesdrop on communications occurring on said target wireless electronic device by impersonating said target wireless electronic device; and
while communication occurs on said target wireless electronic device and while eavesdropping said communication, induce a handover of said target wireless electronic device from said private network system to a public network cell of said public network, and follow said handover to continue eavesdropping on said communication by said private network system;
wherein the inducing of the handover comprises:
instructing said target wireless electronic device, by the private network system, to obtain measurements of public network cells present in the vicinity of said target wireless electronic device;
instructing said target wireless electronic device, by the private network system, to report said measurements back to said private network system; and
falsely reporting, by the private network system to said public network, that an initial network cell serving said target wireless electronic device has a poor signal quality, wherein said false report causes the public network to send a handover command to the private network system.